(12) United States Patent
Muth

(10) Patent No.: US 9,822,620 B2
(45) Date of Patent: *Nov. 21, 2017

(54) PUMPING SYSTEM WITH PLUNGER HAVING A SHAPED EDGE AND COATING

(71) Applicant: Muth Pump LLC, Bakersfield, CA (US)

(72) Inventor: Garold M. Muth, Bakersfield, CA (US)

(73) Assignee: Muth Pump LLC, Bakersfield, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/224,979

(22) Filed: Mar. 25, 2014

(65) Prior Publication Data

US 2015/0275869 A1   Oct. 1, 2015

(51) Int. Cl.

| E21B 43/12 | (2006.01) |
|---|---|
| F04B 7/04 | (2006.01) |
| F04B 47/00 | (2006.01) |
| F04B 47/02 | (2006.01) |
| E21B 34/12 | (2006.01) |
| F16J 1/12 | (2006.01) |

(52) U.S. Cl.
CPC ............ *E21B 43/126* (2013.01); *E21B 34/12* (2013.01); *F04B 7/045* (2013.01); *F04B 47/005* (2013.01); *F04B 47/02* (2013.01); *F16J 1/12* (2013.01)

(58) Field of Classification Search
CPC .... E21B 43/121; E21B 43/126; E21B 43/127; E21B 2043/125; E21B 34/12; E21B 43/12; F04B 7/045; F04B 47/02; F04B 47/005; F16J 1/12

USPC .... 417/545, 546, 547, 552, 554, 555.2, 521; 166/105.1–105.4

See application file for complete search history.

(56) References Cited

U.S. PATENT DOCUMENTS

| 1,422,759 A | 7/1922 | Green |
|---|---|---|
| 2,797,642 A | 7/1957 | Bloudoff |

(Continued)

OTHER PUBLICATIONS

Author: Aan Akhmad Prayoga Title: Chevron study shows Farr plunger outperforms Date published (mm/dd/yyyy): May 13, 2012 Date Accessed (mm/dd/yyyy): Aug. 3, 2016 Link: https://web.archive.org/web/20120513093055/http://www.wepumpsand.com/2011/08/03/chevron-study-shows-farr-plunger-outperforms/.*

(Continued)

*Primary Examiner* — Theodore Stigell
*Assistant Examiner* — Chirag Jariwala
(74) *Attorney, Agent, or Firm* — Kilpatrick Townsend & Stockton LLP

(57) ABSTRACT

In one aspect, the present invention provides a plunger for use in a pumping system. The plunger can include a cylindrical plunger body that is adapted to be coupled to a drive rod. The plunger body can define an aperture configured to receive pumped fluids. The aperture can define an inner diameter of the plunger body. The plunger body can include a leading end having a tapered portion configured to direct solids into the aperture. The tapered portion can be tapered from the inner diameter toward an outer diameter of the plunger body to form a tip aligned with the outer diameter. The tapered portion can include two or more different degrees of taper along a length of the tapered portion. The plunger body can further include a rear end coupleable to a traveling valve.

13 Claims, 8 Drawing Sheets

(56) References Cited

U.S. PATENT DOCUMENTS

| | | | | |
|---|---|---|---|---|
| 2,817,298 | A * | 12/1957 | Bloudoff | F04B 47/00 417/554 |
| 3,167,019 | A | 1/1965 | Harris | |
| 3,380,531 | A | 4/1968 | Mcauliffe | |
| 3,765,483 | A | 10/1973 | Vencil | |
| 3,771,603 | A | 11/1973 | Crowe | |
| 3,802,802 | A | 4/1974 | Greer | |
| 4,056,335 | A | 11/1977 | Secrist | |
| 4,646,839 | A | 3/1987 | Rickey | |
| 5,384,449 | A | 1/1995 | Peirce | |
| 5,505,258 | A | 4/1996 | Muth | |
| 5,715,314 | A | 2/1998 | Payne et al. | |
| 5,765,639 | A | 6/1998 | Muth | |
| 5,934,372 | A | 8/1999 | Muth | |
| 5,992,452 | A | 11/1999 | Nelson, II | |
| 6,250,392 | B1 * | 6/2001 | Muth | E21B 33/122 166/105.2 |
| 6,543,543 | B2 | 4/2003 | Muth | |
| 7,134,851 | B2 * | 11/2006 | Chenoweth | F04B 15/08 417/571 |
| 7,428,923 | B2 * | 9/2008 | Ford | F04B 47/026 166/105.2 |
| 7,891,960 | B2 * | 2/2011 | Lea, Jr. | F04B 47/022 417/552 |
| 8,522,882 | B2 * | 9/2013 | Rich | E21B 43/126 166/105.2 |
| 8,535,024 | B2 * | 9/2013 | Conyers | E21B 43/127 166/105.2 |
| 2006/0169458 | A1 | 8/2006 | Jones | |
| 2014/0105759 | A1 * | 4/2014 | Henry | F04B 47/02 417/53 |
| 2015/0017036 | A1 * | 1/2015 | Krilow | E21B 43/127 417/443 |

OTHER PUBLICATIONS

Request for Ex Parte Reexamination of U.S. Pat. No. 6,543,543 filed Jun. 16, 2011.

Request for Ex Parte Reexamination of U.S. Pat. No. 6,250,392 filed Jun. 27, 2011.

Forge, Moose, "Sucker Rods," Retrieved on Oct. 11, 2016, all pages, retrieved from https://web.archive.org/web/2013070314180/http://mooseforge.com/Metals/sucker_rod.html.

U.S. Appl. No. 14/521,133, filed Oct. 22, 2014, Non-Final Office Action dated Oct. 18, 2016, all pages.

* cited by examiner

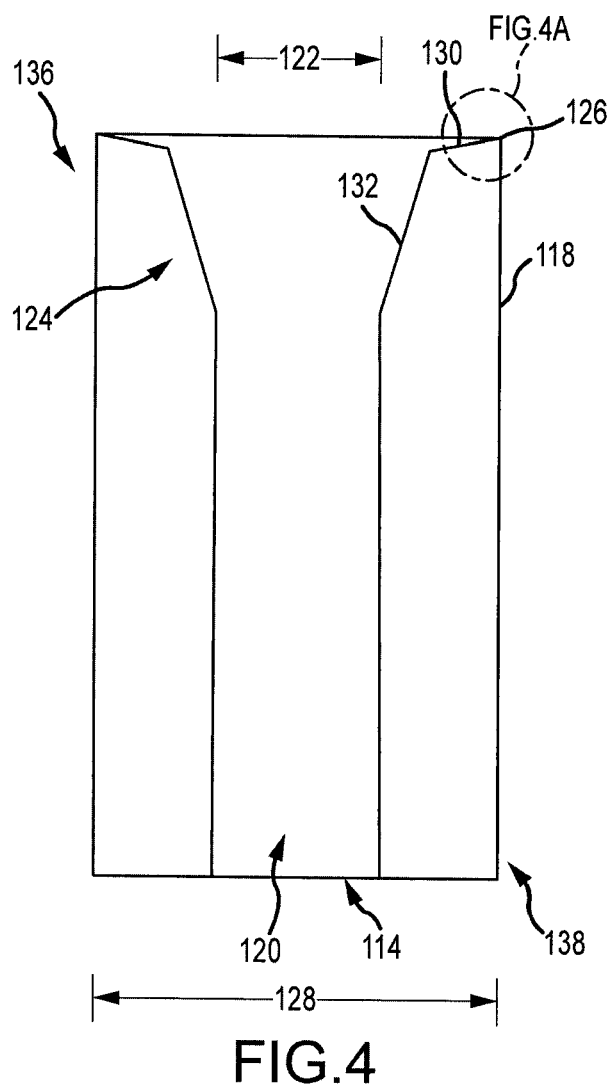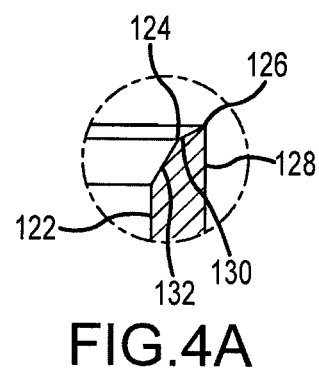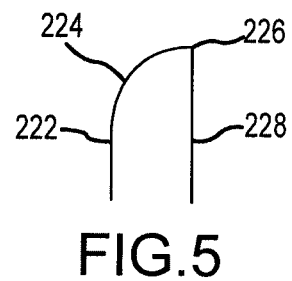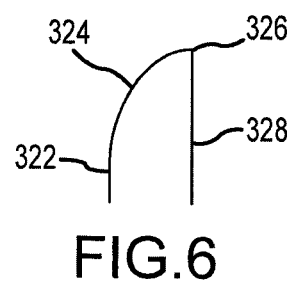

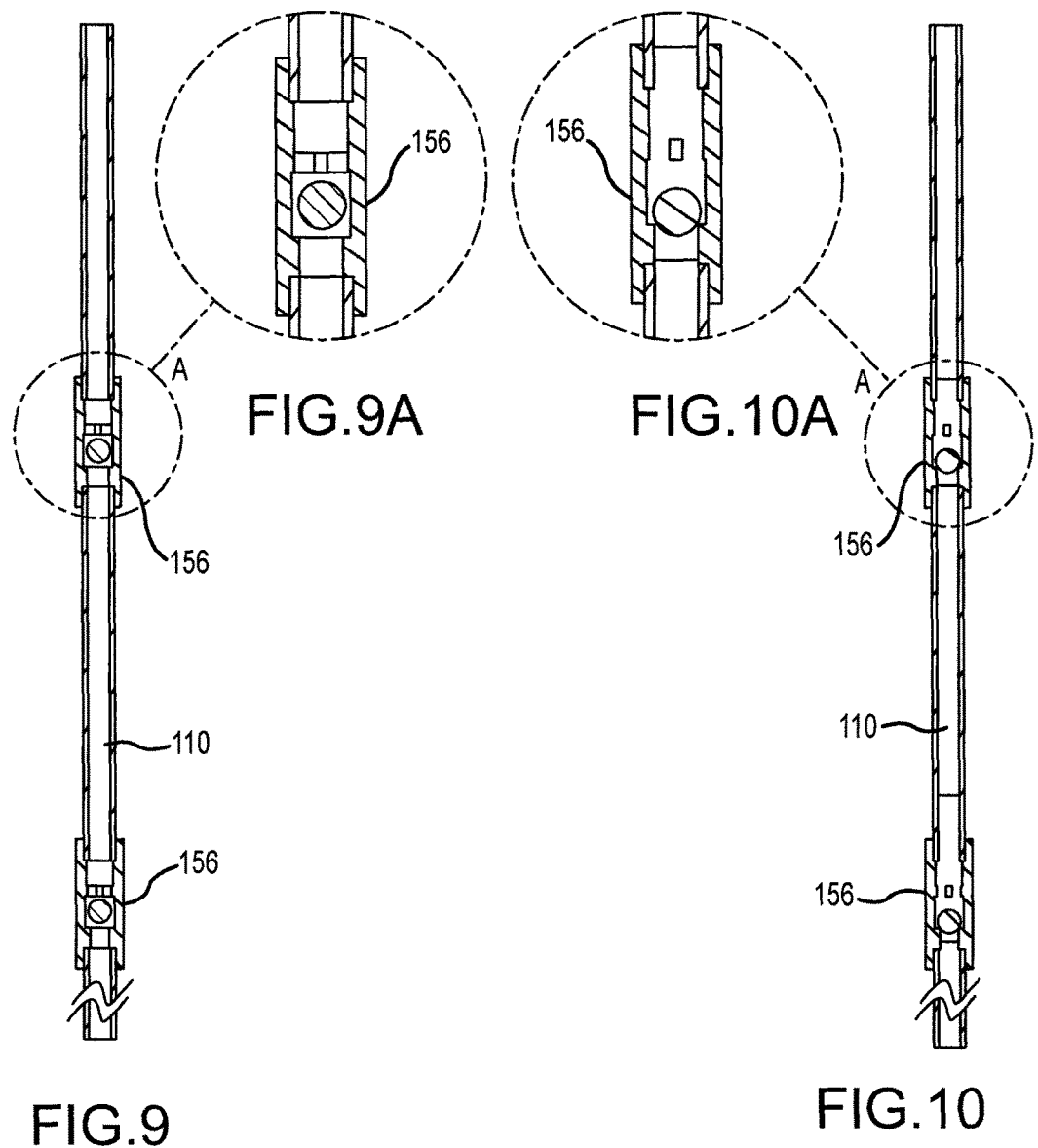

PUMPING SYSTEM WITH PLUNGER HAVING A SHAPED EDGE AND COATING

BACKGROUND OF THE INVENTION

Pumping well fluids from wells penetrating producing formations has been done for many years. Often, heavy viscous oil must be moved to the surface. This oil can be found relatively close to the earth's surface and can contain sand and/or other solid particulate and can be difficult to pump. The presence of sand and other solids in conventional pumps can cause numerous problems, such as premature wear and/or jamming of the pump. The wear and jamming can result in high costs associated with downtime, repair, replacement, and cleanup. Additionally, the wear can create safety concerns, both for the drill crew and for the environment.

Some problems of conventional pumping systems can be attributed to the plunger and its connection to the drive rods. For example, sand can get trapped between a pump plunger and a pump barrel. As the pump reciprocates up and down in the pump barrel during operation, the sand rubs against the plunger, other pump components, and the pump barrel, causing the pump to wear excessively.

The connection between the drive rods and the pump in conventional systems can contribute to the buildup of the damaging precipitate. Specifically, the connection of the drive rod and plunger components in conventional pump systems is positioned at the top of the plunger. Sand can stack up on the top of this connection, causing the plunger to stick in the barrel when there is a power failure or power to the pump is otherwise shut off. Additionally, the geometry of the connector contributes to the problem. Oftentimes, conventional connectors are tapered outward such that any solids are funneled down and outward toward the interface between the inner wall of the pump barrel and the outer diameter of the plunger. This creates more opportunity for sand or other particulate to get between this interface and cause wear to the pump.

Conventional connectors often have a slightly smaller outer diameter than that of the plunger. For example, connector may have an outer diameter that is 1/60,000 of an inch smaller than the outer diameter of plunger. Because of such a configuration, sand tends to accumulate between the connector and the pump barrel upon reciprocation of the plunger. On further operation, the accumulated sand, coarse particulate, or other solids will find its way between the pump barrel and the plunger. As such, significant problems may occur with the pump, including stuck plungers, gaulded plungers and barrels, reduced pump efficiency, and shortened pump life.

Other problems related to sand and other precipitate in the produced fluid may arise due to the overall pump structure. Problems related to a gas build up preventing actuation of valves within the pumping system can cause the system to lock up. In conventional pumps, a hydrostatic fluid column above the pump holds a single traveling valve closed until a pressure under the traveling valve exceeds the pressure created by the hydrostatic fluid column above the traveling valve. If too much gas gets inside the pump barrel and compresses, then the traveling valve will not open and the pump is in a gas locked state.

In conventional pump systems, the pumped fluid flows through a main tubing section that is outside of an aperture of the plunger. Solids may settle out of the pumped fluid and on top of the pump, cementing or otherwise sticking the pump within the tubing. In conventional systems, when stuck, the pump cannot be retrieved by merely pulling the pump out with the drive rods. Instead the replacement of components of the pump downwell requires that the main tubing structure be removed and disassembled to access the pump, causing the pumped fluid within the main tubing structure to be spilled. This is called pulling a wet well, which can create environmental and safety problems. Improvements in handling of sand and gas within downwell pumping systems are desired.

BRIEF SUMMARY OF THE INVENTION

Embodiments of the present invention serve to provide systems and methods to improve the ability of a pump to handle sand and other solids within a production fluid. Plungers having tapered pointed tips at their outer periphery ensure a tight fit within a pump barrel, preventing solids from getting between the plunger and the pump barrel and causing excessive wear. In some embodiments, hollow drive rods can serve as a conduit for the production fluid travel to the surface. A series of check valves and/or traveling valves can ensure that the pump system can handle both solids and the introduction of gas trapped within the production fluid.

In one aspect, the present invention provides a plunger for use in a pumping system. The plunger can include a cylindrical plunger body that is adapted to be coupled to a drive rod. The plunger body can define an aperture configured to receive pumped fluids. The aperture can define an inner diameter of the plunger body. The plunger body can include a leading end having a tapered peripheral portion configured to direct solids inwardly into the aperture. The tapered portion can be tapered from the inner diameter toward an outer diameter of the plunger body to form a tip aligned with the outer diameter. The tapered portion can include two or more different degrees of taper along a length of the tapered portion. The plunger body can further include a rear end coupleable to a traveling valve.

In some embodiments, the tapered portion can include a first section and a second section. The first section can have a different degree of taper than the second section. The first section can include a leading edge of the plunger. The first section can have a lower degree of taper than the second section. In some embodiments, the first section and the second section each can have a taper within a range of about 5 to 80 degrees. In some embodiments, the first section can have a taper of between about 5 to 30 degrees and the second section can have a taper of between about 45 to 75 degrees. In other embodiments, the tapered portion can include an arc having a constant radius. The tapered portion can include an arc having a variable radius. In some embodiments, the leading end of the plunger comprises a pointed tip at the outer periphery. In other embodiments, at least some surfaces of the plunger can include a wear resistant or lubricating coating.

In another aspect, the present invention provides a pumping system. The pumping system can include a pump barrel adapted to be placed into a well casing. The pump barrel can include a standing valve. The pumping system can also include a conduit having a top end and a bottom end. The top end is coupleable with a surface pumping unit. The conduit can be coupled to a plunger assembly at the bottom end and is translatable to reciprocate the plunger assembly within the pump barrel using an upstroke and a downstroke. The plunger assembly can include a plunger reciprocatably positioned within the pump barrel. The plunger can have an inner diameter, an outer diameter, a bottom end, and an open top end with a tapered edge that is tapered from the inner diameter toward the outer diameter to form a tip aligned with the outer diameter. The plunger assembly can also include a connector coupled with the bottom end of the conduit and with the plunger at a position below the top end. The connector can be configured to permit fluids to be moved upwardly through the connector and the conduit upon each downstroke of the plunger assembly. The top end of the plunger can be adapted to direct particulate into the plunger and away from the pump barrel upon each upstroke. The plunger assembly can also include a traveling valve positioned at a bottom end of the plunger. Upon each upstroke, the traveling valve is closed and the standing valve is opened to cause a vacuum within the pump barrel to draw fluid into the plunger assembly below the traveling valve. Upon each downstroke, the traveling valve is opened and the standing valve is closed to force the fluid through the traveling valve and through the conduit to the surface.

In some embodiments, the plunger is a first plunger and the tapered portion is a first tapered portion, and the pumping system further includes a second plunger reciprocatably positioned within the pump barrel and spaced apart and coupled with the first plunger. The second plunger can include an open bottom end with a second tapered edge that is tapered towards an inner wall of the pump barrel. The bottom end of the second plunger can be adapted to direct particulate into the plunger and away from the pump barrel upon each downstroke.

In some embodiments, the first tapered edge and the second tapered edge each include a first portion tapered toward the inner wall of the pump barrel and a second portion tapered toward the inner wall of the pump barrel. The first portion can have a different degree of taper than the second portion. In some embodiments, the first portion can include a taper of between about 5 to 30 degrees and the second portion can include a taper of about 45-75 degrees. In other embodiments, the first tapered edge and the second tapered edge each form a pointed tip. Each pointed tip can have a diameter at the outer periphery that is within 0.001 inches of an inner diameter of the pump barrel. In other words, the tolerance between the tip and the pump barrel is about 0.001 inches to about 0.002 inches. In some embodiments, the pumping system can further include at least two traveling valves disposed between the first plunger and the second plunger. In other embodiments, the conduit further includes a plurality of check valves disposed along a length of the conduit. In some embodiments, at least one of an outer diameter of each of the first plunger and the second plunger or an inner diameter of each of the first plunger and the second plunger includes a lubricating wear resistant coating.

In another aspect, the present invention provides a method for pumping fluids from the ground. The method can include placing a pumping system into the ground. The pumping system can include a pump barrel adapted to be placed into a well casing. The pump barrel can include a standing valve. The pumping system can also include a plunger assembly. The plunger assembly can include a conduit for transporting pumped fluid. The conduit can be disposed within the pump barrel and can have a top end and a bottom end. The top end can be coupleable with a surface pumping unit. The plunger assembly can further include a plunger having an open top end with a tapered edge. The plunger may be reciprocatably positioned within the pump barrel. The plunger can have an inner diameter, an outer diameter, a bottom end, and an open top end with a tapered edge that is tapered from the inner diameter toward the outer diameter to form a tip aligned with the outer diameter. The plunger assembly can include a traveling valve disposed at a bottom end of the plunger. The plunger assembly can also include a connector coupled to the plunger below the open top end and coupled with the bottom end of the conduit. The connector is configured to permit fluids to be moved upwardly through the connector and the conduit during operation of the plunger assembly. The method can further include reciprocating the conduit and plunger within the pump barrel with at least one upstroke and at least one downstroke. The method can include closing the traveling valve and opening the standing valve upon each upstroke to create a vacuum within the pump barrel and plunger assembly to draw fluid into the plunger assembly below the traveling valve. The method can further include opening the traveling valve and closing the standing valve upon each downstroke to force the fluid through the traveling valve and through the conduit to the surface. The method can also include directing particulate into the first plunger through the open top end and away from the pump barrel upon each upstroke with the tapered edge.

In some embodiments, the plunger is a first plunger and the method further includes reciprocating a second plunger having an open bottom end with a tapered edge. The second plunger can be coupled with the first plunger. The method can further include directing particulate into the second plunger through the open bottom end and away from the pump barrel upon each downstroke with the tapered edge. In other embodiments, the tapered edge includes a first portion tapered towards an inner wall of the pump barrel and a second portion tapered towards the inner wall of the pump barrel. The first portion can have a different degree of taper than the second portion.

In another aspect, the present invention provides a plunger assembly. The plunger assembly can include a connector coupleable to a reciprocatable rod. The connector can be configured to permit fluids to be moved upwardly through the connector upon a downstroke of the plunger assembly. The plunger assembly can include a first plunger having an inner diameter, an outer diameter, a bottom end, and an open top end with a tapered edge that is tapered from the inner diameter toward the outer diameter to form a tip aligned with the outer diameter. The tapered edge can have two or more different degrees of taper along a length of the tapered edge. The first plunger can be coupled with the connector at a position below the top end. The first plunger can be configured to reciprocate within a pump barrel. The top end of the first plunger can be adapted to direct particulate into the first plunger and away from the pump barrel upon an upstroke of the plunger assembly. The plunger assembly can further include a traveling valve have a top end and a bottom end, the top end of the traveling valve being positioned at a bottom end of the first plunger. The plunger assembly can also include a second plunger comprising an inner diameter, an outer diameter, a top end, and an open bottom end with a tapered edge that is tapered from the inner diameter toward the outer diameter to form a tip aligned with the outer diameter. The second plunger can be coupled with the bottom end of the traveling valve. The second plunger can be configured to reciprocate within a pump barrel. The bottom end of the second plunger can be adapted to direct particulate into the second plunger and away from the pump barrel upon each downstroke of the plunger assembly. Upon each upstroke, the traveling valve is closed and the standing valve is opened to cause a vacuum within the pump barrel to draw fluid into the plunger assembly below the traveling valve. Upon each downstroke, the traveling valve is opened and the standing valve is closed to force the fluid through the traveling valve and up to the surface. In some embodiments, the tapered edge can have two or more different degrees of taper along a length of the tapered edge.

For a fuller understanding of the nature and advantages of the present invention, reference should be had to the ensuing detailed description taken in conjunction with the accompanying drawings.

BRIEF DESCRIPTION OF THE DRAWINGS

FIG. 4 depicts the plunger of FIG. 1 according to embodiments of the invention.

FIG. 4A shows a more detailed view of a tip of the plunger of FIG. 4 according to embodiments of the invention.

FIG. 5 shows a tip of a plunger having an arc of constant taper according to embodiments of the invention.

FIG. 6 depicts a tip of a plunger having an arc of variable taper according to embodiments of the invention.

FIG. 9 shows the check valves of FIG. 1 in an open position according to embodiments of the invention.

FIG. 9A shows a more detailed view of an open check valve of FIG. 9 according to embodiments of the invention.

FIG. 10 shows the check valves of FIG. 1 in a closed position according to embodiments of the invention.

FIG. 10A shows a more detailed view of a closed check valve of FIG. 10 according to embodiments of the invention.

DETAILED DESCRIPTION OF THE INVENTION

Figure 1:
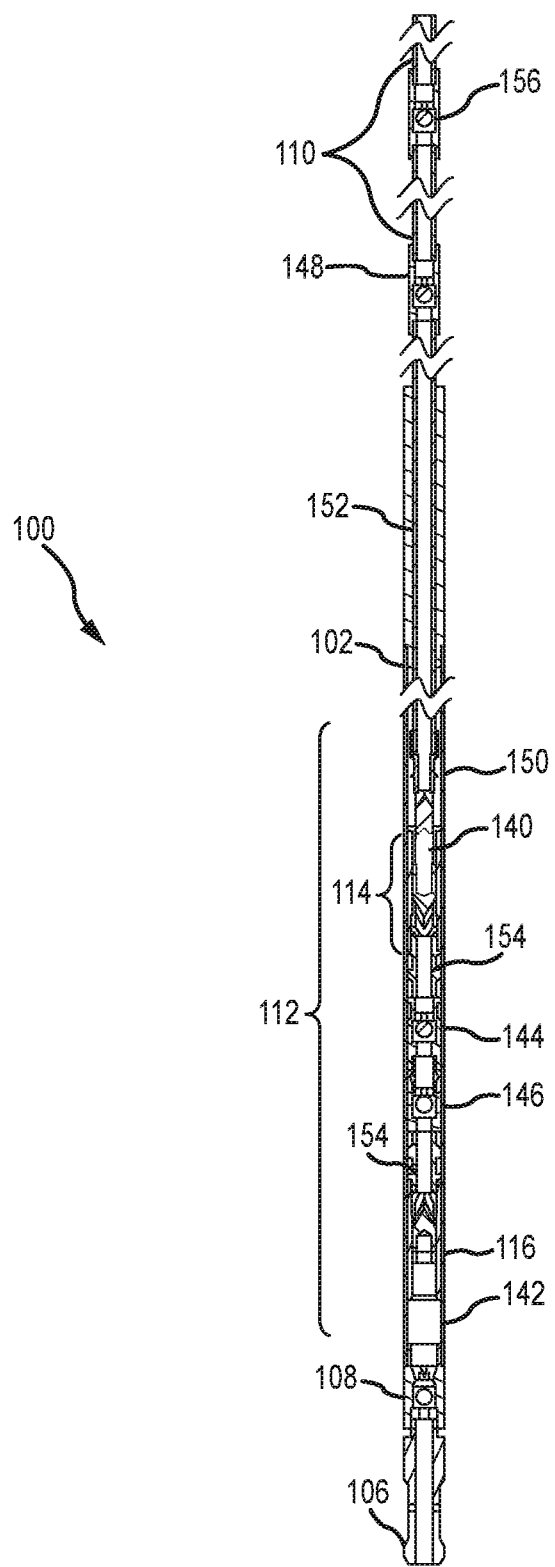
FIG. 1 depicts a cross-sectional side view of a downwell pump according to embodiments of the invention.
Figure 2:
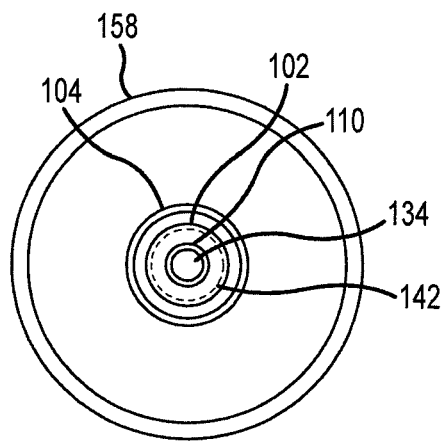
FIG. 2 shows a cross-sectional top view of the downwell pump of FIG. 1 positioned within an outer tubing and larger casing string according to embodiments of the invention.
Figure 3:
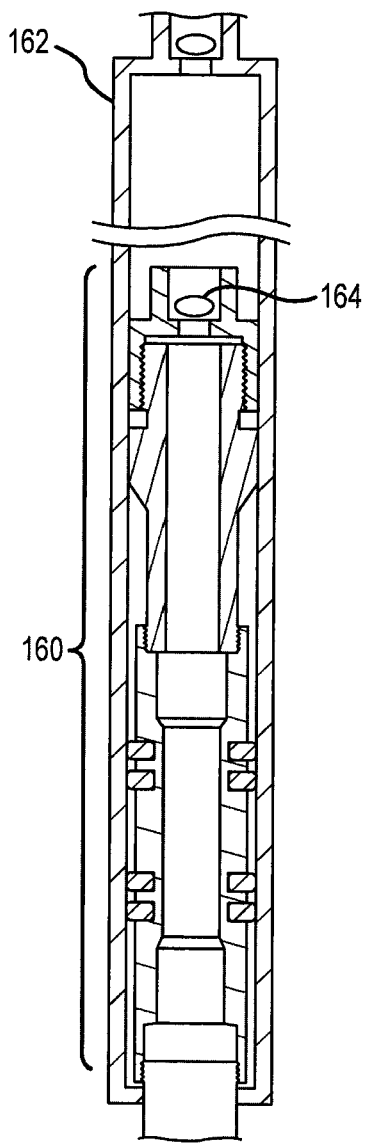
FIG. 3 shows a cross-sectional side view of a stationary plunger assembly according to embodiments of the invention

In some embodiments, the present invention as illustrated in FIG. 1 provides a pump system 100 for pumping fluids to the earth's surface. Pump system 100 includes a pump barrel 102 positioned within an outer tubing string 104 or well casing 158 as seen in FIG. 2. Well tubing 104 can be contained within a larger casing string 158. Referring back to FIG. 1, pump barrel 102 can be cylindrical in geometry and has a bottom end 106 where a standing valve 108 is disposed. A top end of the pump barrel 102 can extend to the ground surface. In some embodiments, pump barrel 102 and standing valve 108 remain in a fixed position downwell, while a plunger assembly 112 is reciprocated within the pump barrel 102 to draw fluid to the surface. The function and structure of plunger assembly 112 is described in greater detail in the discussion of FIG. 7. Other embodiments, such as shown in FIG. 3, have a fixed plunger assembly 160 and a reciprocating pump barrel 162 and standing valve 164 to draw fluids to the surface. Fixed plunger assembly 160 can have similar features as plunger 112 described herein. As shown in FIG. 1, pump system 100 can also include a rod 110 that is connected to a plunger assembly 112. Rod 110 and plunger assembly can be configured to fit within pump barrel 102. In some embodiments, rod 110 can be hollow and can form a lumen 134 through which the produced fluids may flow. The rod 110 can include a top end and a bottom end. The top end can be coupled to a surface pumping unit as is known in the art. The bottom end of the rod 110 may be coupled with the plunger assembly 112. The rod 110 is translatable to reciprocate the plunger assembly 112 within the pump barrel 102 to produce fluid from the well.

The fluid conduit drive rod 110 provides a smaller cross-section and/or diameter than conventional pump fluid paths. This smaller cross-section increases the velocity of the pumped fluid. The increased velocity allows any solids in the pumped fluid to be propelled to the surface of the well and prevents the solids from settling out of the fluid as it moves towards the surface. In conventional pumps, the lower fluid velocity allows the solids to settle out and form large plugs within the main tubing. For example, the inner diameter of rod 110 may be in the range from about 1.0 inch to about 1.5 inches.

In operation, rod 110 is translated downward to slide plunger assembly 112 further into pump barrel 102 (referred to as the downstroke). In so doing, standing valve 108 is forced closed and traveling valve 144 is forced open due to the presence of a fluid within pump barrel 102. The fluid entering plunger assembly 112 passes upward where it may be evacuated from the pump. In some embodiments, the fluid is evacuated through a main tubing string or pump barrel positioned outside of the rod. In other embodiments, the fluid can be evacuated through the lumen 134 of rod 110. In such systems, rod 110 serves as a conduit for the produced fluid to reach the surface. Here, the rod 110 is reciprocated to drive the plunger assembly 112 while simultaneously having the fluid flow within the rod 110. In such embodiments, the lumen 134 has a smaller cross-section and/or diameter than the pump barrel 102 or main tubing string used in conventional systems. This allows the produced fluid to be drawn to the surface with a higher velocity, propelling any sand or other solids to the surface. This prevents a buildup of solids within the pump barrel 102 and plunger assembly 112, reducing the wear associated with sand getting between the two components and extending the life of the pump. Additionally, by including the pumped fluids within the hollow rod 110, there is no need to pull a wet pump, as the fluid is transported through the lumen 134 in the center of the pump system and all components are accessible without opening the fluid conduit.

After the downstroke, the rod 110 is then lifted upward (referred to as the upstroke) to close traveling valve 144 and to open standing valve 108. This action causes a vacuum within pump barrel 102, causing standing valve 108 to lift and production fluids to enter into pump barrel 102 and/or conduit 110. On the next downstroke, the process is repeated to pump additional fluids out of the well. The traveling valves 144 and standing valve 108 function in a similar manner to pump fluids in embodiments where the pump barrel 102 is reciprocated while the plunger assembly 112 remains stationary.

Plunger assembly 112 can include one or more plungers 114 and at least one traveling valve 144. The structure of each plunger 114 is described in greater detail in the discussion of FIG. 4. Each of the one or more plungers 114 can include a top end, a bottom end, and a cylindrical body. One or more traveling valves 144 may be positioned near the bottom end 106. In embodiments having multiple plungers 114, one or more traveling valves 144 can be positioned between the plungers 114. An aperture can be formed in the cylindrical body and can define an inner diameter of each plunger 114. Each plunger 114 can include a sharpened leading edge formed from a tapered section of the plunger 114. The tapered portion can be tapered from the inner diameter toward an outer diameter of the plunger 114 to form a tip aligned with the outer diameter. In some embodiments, the top end of a first plunger 114 includes a first portion and a second portion that are tapered towards the outer diameter of the first plunger 114. The first portion and the second portion can have different degrees of taper. For example, the first portion can have an angle in the range of 5° to 30°, and in some cases of approximately 15°, while the second portion can have a larger angle than the first portion, such as an angle in the range of 45° to 80°, and in some cases of approximately 60°. In other embodiments, the second portion can have a smaller angle than the first portion. In some embodiments, the top end may include more than two portions that are tapered. Additionally, top end may have a single portion with a degree of taper that gradually changes from a tip of the top end to a distal side of the top end.

A connector 140 can be coupled within first plunger 114 spaced a distance below the top end. The connector 140 can then be coupled to a bottom end of a drive rod of a conventional system or a hollow rod or other conduit 110 as described above. The connector 140 can be configured to include a lumen such that fluids can move upwardly through the connector 140 and the conduit 110 upon each upstroke and downstroke of the plunger assembly. The low coupling position of connector 140 within the first plunger 114 eliminates the funneling effect seen in conventional pumps that directs solids towards the interface between the plunger and the pump barrel wall. Rather, the lower coupling position enables solids to pass through the central aperture of the first plunger 114 to greatly reduce the wear between plunger assembly 112 and pump barrel 102, thereby prolonging the life of the pump system 100. By constructing pump system 100 in this manner, a tighter fit may be provided between plunger assembly 112 and pump barrel 102 without experiencing gaulding. The tighter fit can be achieved, for example, where an outer diameter of first plunger 114 is between about 0.001 inches and about 0.002 inches of a diameter of the inner wall of pump barrel 102. Additionally, a higher pump efficiency may be achieved along with additional production of fluids due to the tighter fit of the components. Further, by reducing the amount of sand between plunger assembly 112 and pump barrel 102, less well pulling is also required. As such, lower operating costs may be achieved resulting in higher profits.

In some embodiments utilizing hollow rods 110, a fluid inverter 150 is coupled between the connector 140 and hollow rod 110. Fluid inverter 150 ensures that the produced fluid is directed from the first plunger 114 and/or the pump barrel 102 to inner lumen 134 of the hollow rod 110. Pumping systems 100 having hollow rods 110 and fluid inverter 150 may also include a sealing unit 152 that prevents the flow of production fluids upwardly through the outer tubing casing 104. This ensures that the fluid flow may be diverted by fluid inverter 150 into hollow rod 110.

The invention provides techniques for preventing or greatly reducing the amount of accumulated sand and other solids at the top of the first plunger 114 to prevent solids from being deposited between the first plunger 114 and pump barrel 102. This may be accomplished, for example, by moving connector 140 from the top of the first plunger 114 such that it is disposed within the first plunger 114 at a distance below the top end of the first plunger 114. For example, connector 140 can be spaced between about 1.0 inch and 6.0 inches from the top end of the first plunger. In this way, coarse particulate will not tend to accumulate at the top of the first plunger 114. Further, the wall of the first plunger 114 may be inwardly double tapered so that the first plunger 114 acts as a scraper on the upstroke to scrape the solids from the walls of the pump barrel 102.

On the downstroke of plunger assembly 112, standing valve 108 closes and traveling valve 144 opens to permit fluid to pass upwardly through plunger assembly 112. Upon the upstroke of plunger assembly 112, traveling valve 144 closes and standing valve 108 opens in a manner similar to that previously described with pump system 100. Because connector 140 is disposed within first plunger 114, connector 140 does not assist in accumulating solids on top of top end of first plunger 114. Instead, the open top end serves to direct or funnel sand or other solids into the interior of first plunger 114 and the plunger assembly 112 and away from an inner wall 142 of pump barrel 102. Further, upon the downstroke of plunger assembly 112, fluid that is moved upwardly through the plunger assembly 112 catches the solids and moves them upward without causing any damage to the pump system 100. Moreover, the sharpened edge at top end of first plunger 114 serves to scrape and clean the walls of pump barrel 102 upon each upstroke. In this way, the chances for having sand or other coarse particulate accumulate between plunger assembly 112 and pump barrel 102 are eliminated or greatly reduced.

A second plunger 116 may be included at a bottom end of the plunger assembly 112. The second plunger 116 can include the same design characteristics as the first plunger 114 and may be flipped 180 degrees, such that the leading edge and tapered portion are near a bottom end of the second plunger 116. The sharpened leading edge of the second plunger 116 can scrape against the pump barrel inner wall 142 and the tapered portion can direct any solids into the center aperture of the plunger assembly 112 upon each downstroke of the plunger assembly 112. The second plunger 116 is especially useful in horizontal pumping operations where sand and other solids can settle to a bottom, or side wall 142, of the pump barrel 102. The sharpened leading edge can then scoop up the solids and prevent the solids from getting wedged between the plunger assembly 112 and the pump barrel wall 142.

In some embodiments, multiple traveling valves 144 are included. The structure of traveling valves 144 are discussed more in the description of FIG. 7. For example, some pumping systems 100 may include multiple traveling valves 144 positioned between the first and the second plungers 114 and 116. For example, a top end of a first traveling valve 144 may be coupled with the bottom end of the first plunger 114. A top end of a second traveling valve 146 may be coupled with a bottom end of the first traveling valve 144. Second traveling valve 146 can be configured to have the same features as traveling valve 144 as described herein. A second plunger 116 may be coupled with a bottom end of the second traveling valve 146. In some embodiments, the first traveling valve 144 has a female connector and the second traveling valve 146 has a male connector that can interface with the female connector. These connectors may be reversed, and in some embodiments, other coupling mechanisms may be used to secure the components of the plunger assembly. These valves can ensure that solids do not fill the plunger assembly 112 during a shut down or power failure. Smaller amounts of solids can be trapped at each traveling valve 144, such that less fluid pressure is needed to force each traveling valve 144 open.

Additionally, some pumping systems 100 may include a traveling valve 148 positioned above the plunger assembly 112, near the bottom end of the conduit 110. Traveling valve 148 can have the same features as traveling valve 144, but is positioned above the plunger assembly 112. This traveling valve 148 prevents any solids from produced fluids that have been pumped beyond the plunger assembly 112 from settling within the plunger assembly 112. Instead, any solids that settle out of the pumped fluid would be stopped at the traveling valve 148 atop the plunger assembly 112. The use of multiple traveling valves 144 can also prevent gas locking, as the upper traveling valve 148 prevents hydrostatic fluid column pressure above the plunger assembly 112 from holding the lower traveling valve or valves 144 and 146 closed. Thus, the lower traveling valves 144 and 146 can open and let in more produced fluid.

Pumping system 100 may include one or more check valves 156 positioned along the conduit 110. The structure of check valves 156 is described in greater detail in the discussion of FIGS. 9-10B. Check valves 156 can serve similar functions as upper traveling valve 148, preventing both gas lock and large deposits of solids from forming on the plunger assembly 112. By including a series of check valves 156 positioned along a length of the hollow rod 110, the size of deposit of solids on each check valve 156 is reduced, as is the amount of hydrostatic fluid column pressure. Thus, on startup, the pumping system 100 can move a single check valve section at a time, reducing the force needed to start the pump system 100.

FIG. 4 shows a more detailed view of the first plunger 114 and second plunger 116 of FIG. 1. While the following description refers to plunger 114 for convenience, it will be appreciated that second plunger 116 can have the same features. Plunger 114 can be used in a the hollow rod pumping system 100 described in FIG. 1 or can be used in other applications, such as conventional pumping systems. For example, plunger 114 may be utilized as first plunger 114 and/or second plunger 116. Plunger 114 can be configured to fit within a pump barrel of a downwell pump and may have a cylindrical body 118. The cylindrical body 118 may include a top end 136 and a bottom end 138 and may define an aperture 120 that can receive any pumped fluids. The aperture 120 can define an inner diameter 122 of the plunger body 118. Plunger 114 can be positioned on a top end and/or a bottom end of a plunger assembly. In some embodiments, the plunger 114 can include a tapered portion or tapered leading edge 124. Tapered leading edge 124 may be positioned at either the top end 136 or the bottom end 138. The placement of the leading edge 124 correlates with whether plunger 114 is at the top end or bottom end of a plunger assembly. The tapered leading edge 124 enables any sand or other solid precipitate within a produced fluid to be forced into the aperture 120 of the plunger 114 instead of resting on top of the plunger 114 or between the plunger 114 and an inner wall of the pump barrel. In some embodiments, it may be desirable for the tapered leading edge 124 to end in a sharp point 126. A sharp point 126 ensures a tight fit between the edge of the plunger 114 and the inner wall of the pump barrel. In some embodiments, the sharp point or pointed tip 126 has an outer diameter 128 within about 0.002 inches of an inner diameter of the pump barrel to ensure a tight fit. The tight fit ensures that solids will not get between the pump assembly and the pump barrel and also allows for increased pump efficiency. In some embodiments, the tight fit may be further enhanced by incorporating a wear resistant and/or lubricating coating on some or all of the surfaces, such as the inner diameter 122 and/or the outer diameter 128 of the plunger 114. By coating the outer surface of the plunger 114, the plunger 114 is prevented from sticking within the pump barrel, while allowing a tighter tolerance fit. Galling and other wear can also be reduced using the coating on the outer diameter 128 of the plunger 114. The coating on the inner surface of the plunger 114 can protect the inner diameter 122 of the plunger 114 from being eaten away by any corrosive gases or other materials within the produced fluid. The coating can also prevent any abrasive solids from damaging the plunger body 118.

A tapered leading edge having a rounded or otherwise non-pointed tip may allow for sand or other precipitate to be wedged between the tip and the pump barrel. A pointed tip 126 can seal against the inner wall of the pump barrel to help eliminate any solids that can get trapped between the outer diameter 128 of the plunger 114 and the inner wall of the pump barrel, reducing the amount of wear of the plunger 114, pump components, and pump barrel.

The tapered leading edge 124 is tapered from the inner diameter 122 toward the outer diameter 128 of the plunger body 118. The tapered leading edge 124 can form a sharpened tip 126 that is aligned with the outer diameter 128. The sharpness of the tapered leading edge 124 may be limited to prevent excessive or premature wear of the point. When the edge loses sharpness, the seal against the pump barrel is compromised, allowing solids to enter the interface between plunger 114 and the pump barrel. A lesser degree of taper can provide a robust solution while still keeping sand and other precipitates out from between the pump barrel and the plunger 114. A taper that funnels solids into the aperture 120 of plunger 114 while providing a sturdy tip can be achieved by a leading edge 124 including a first section 130 forming the tip 126 of the leading edge 124 to seal against the pump barrel and guide solids inward and a second section 132 that funnels solids into the aperture 120. In some embodiments, the first section 130 has a smaller degree of taper than the second portion 132 as seen in FIG. 4A. For example, the first section 130 may have a taper of about 15 degrees while the second section 132 may have a taper of about 60 degrees. In some embodiments, the second section 132 can be machined, molded, or otherwise forged into the plunger 114. The first section 130 can then be formed at an end of the second section 132 proximal to the leading edge 124. For example, the second section 132 can be ground or otherwise deformed at an angle to form the first section 130 having a lesser degree of taper. The respective tapers can be of any degree. For example, the amount of taper for the first section 130 and the second section 132 can range from between 5 and 80 degrees. In some embodiments, the first section 130 can have a taper of between about 5-30 degrees. The second section 132 can have a taper of between about 45-80 degrees. For example, the first section 130 can have a taper of about 15 degrees and the second section 132 can have a taper of about 60 degrees. In some embodiments, the second section 132 can have a smaller degree of taper than the first section 130 in some embodiments.

Embodiments of the invention can taper the leading edge 124 with differently shaped tapers. For example, the leading edge 124 can include additional sections having different degrees of taper to create a desired taper geometry to accommodate various precipitate types. FIGS. 5 and 6 show close up views of tips of plungers having different geometries of taper in accordance with some embodiments of the invention. In FIG. 5, a tapered section 224 can be a single section with a curved taper connecting an inner diameter 222 to an outer diameter 228. The tapered section 224 can include a radius of constant curvature, such as a circular arc.

Tapered section 224 can terminate in a pointed tip 226 that is aligned with the outer diameter 228. FIG. 6 shows a tapered section 324 forming an arc having radius of variable curvature such that parts of the tapered section 324 are more severely tapered from an inner diameter 322 towards an outer diameter 328 of the plunger. Tapered section 324 can terminate in a pointed tip 226 that is aligned with the outer diameter 328. Other shapes for a tapered section can include any curved shape or combination of curved shapes and/or linear sections that ends in a pointed tip aligned with the outer diameter of the plunger.

Conventional pumps use longer plungers to account for inefficiencies in the pumping of fluids. The higher efficiency attributed to the tighter fit of plunger 114 allows plunger 114 to be produced having a shorter length than a conventional plunger while providing comparable, and in many cases, superior efficiency. For example, the plunger 114 may have a length of between about 6 inches and 24 inches. The shortened length of plunger 114 enables plunger 114 to be used in horizontal wells, as well as vertical wells. The shortened length allows the plunger 114 to traverse around a heal or radius of the pump barrel without binding or sticking.

Figure 7:
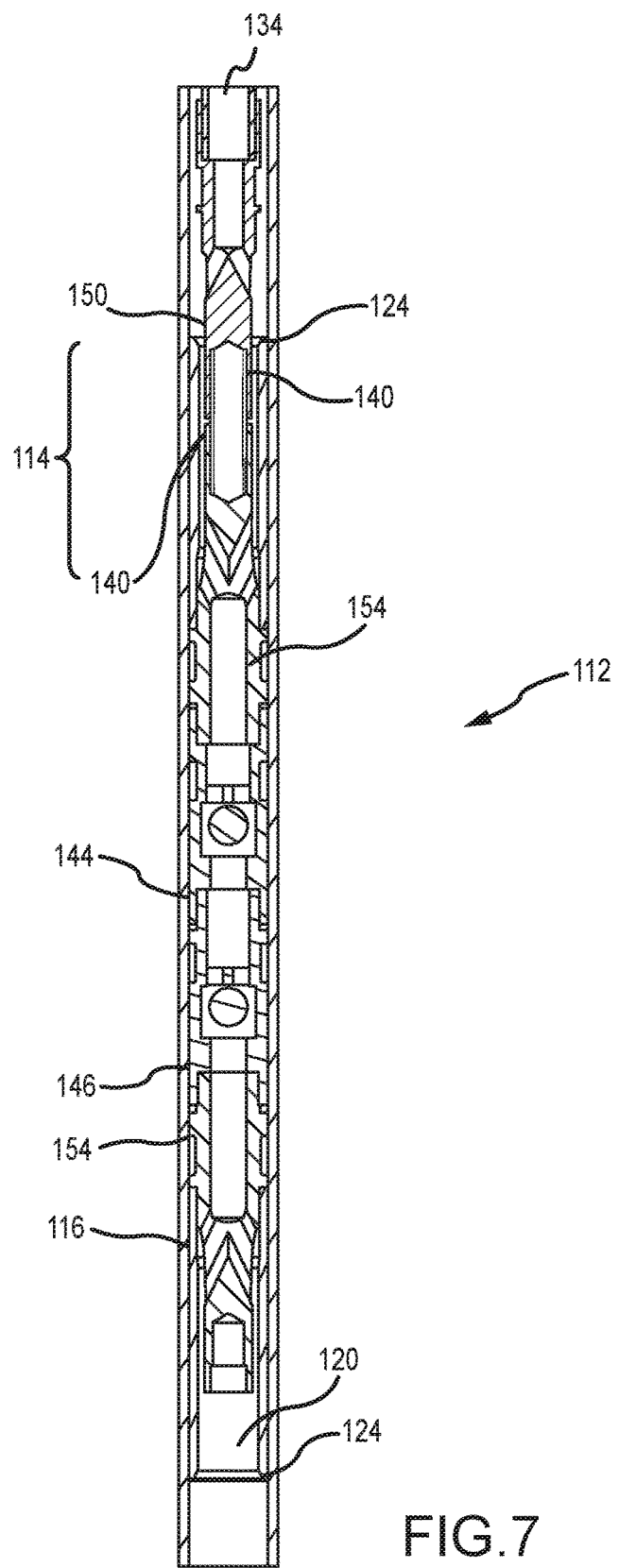
FIG. 7 shows a cross-sectional view of the plunger assembly of FIG. 1 according to embodiments of the invention.
Figure 8:
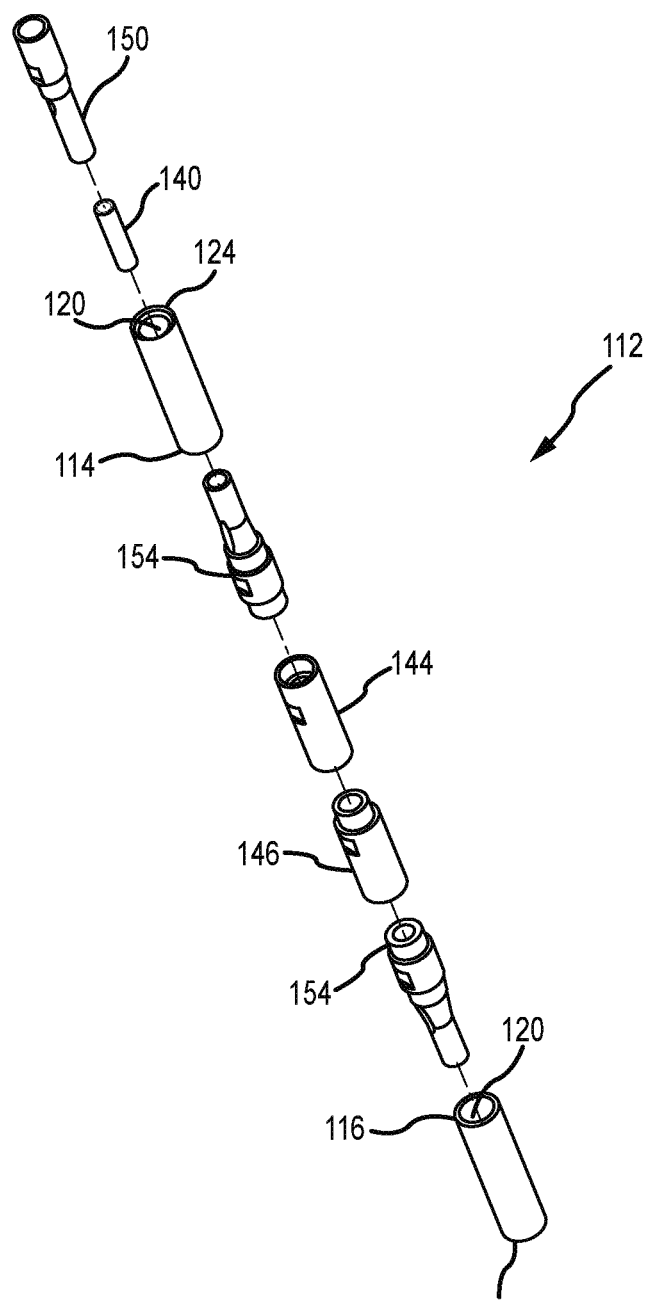
FIG. 8 shows an exploded view of the plunger assembly of FIG. 1 according to embodiments of the invention.

FIGS. 7 and 8 depict cross-sectional and exploded views, respectively, of plunger assembly 112 that has been removed from a pump barrel. Plunger assembly 112 includes plungers 114 and 116 as described above with FIG. 4 at both a top and a bottom of the assembly 112, respectively. Plunger assembly 112 can be utilized in pumps such as pumping system 100 in FIG. 1. In some embodiments, a single plunger 114 may be used, positioned at the top of the assembly 112. Each plunger 114 and 116 can include a tapered leading edge 124. By using a plunger 114 and 116 at both a top end and a bottom end of the pump assembly 112, precipitate can be funneled or otherwise directed into a central aperture 120 of the plunger 114 on both the downstroke and the upstroke of the pump in a downhole pump operation. In horizontal pumping operations, the use of plungers 114 and 116 on both ends of the plunger assembly 112 ensures that any solids are pushed or scooped into a center of the plunger 114 and/or 116 on both the upstroke and the downstroke motions.

The plunger assembly 112 can also include two or more traveling valves 144. Each traveling valve 144 can have a cylindrical body and include a central aperture to enable fluid to pass through the body. A sealing element can be movably seated in the aperture to seal the traveling valve 144. For example, the aperture can have a circular shape and the sealing element may be a spherical stainless steel ball having a diameter larger than that of the aperture. Any other shape of aperture and sealing element may be used such that the sealing element can completely seal the aperture. Sealing elements may be constructed of any material of sufficient density to seal the aperture on each upstroke of the plunger assembly 112 and to enable the sealing element to unseat from the aperture to allow fluid to pass through the cylindrical body upon each downstroke of the plunger assembly 112. Plunger assemblies 112 may include multiple traveling valves 144 and 146 positioned between the first and the second plungers 114 and 116. Traveling valve 146 can have the same features as traveling valve 144. For example, a top end of a first traveling valve 144 may be coupled with the bottom end of the first plunger 114. A top end of a second traveling valve 144 may be coupled with a bottom end of the first traveling valve 144. A second plunger 116 may be coupled with a bottom end of the second traveling valve 144. In some embodiments, the first traveling valve 144 has a female connector and the second traveling valve 144 has a male connector that can interface with the female connector. These connectors may be reversed, and in some embodiments, other coupling mechanisms may be used to secure the components of the plunger assembly.

In some embodiments, traveling valves 144 can be coupled with plungers 114 and/or 116 using connecting pieces 154. In other embodiments, traveling valves 144 can be coupled directly with plungers 114 and/or 116 or by any other component or mechanism. The use of multiple traveling valves 144 ensures that solids do not fill the pump during a shut down or power failure. Smaller amounts of solids can be trapped at each traveling valve 144, such that less fluid pressure is needed to force each traveling valve 144 open. A traveling valve 148 can also be positioned above the plunger assembly 112 near the first plunger 114. This traveling valve 148 can have the same features as traveling valve 144 and prevents any solids from fluids that have been pumped beyond the plunger assembly 112 from settling within the plunger assembly 112. Instead, any solids that settle out of the pumped fluid would be stopped at the traveling valve 148 atop the plunger assembly 112. The use of multiple traveling valves 144 can also prevent gas locking, as the upper traveling valve 144 prevents hydrostatic fluid column pressure above the plunger assembly 112 from holding the lower traveling valve or valves 144 and 146 closed. Thus, the lower traveling valve 144 can open and let in more produced fluid.

In some embodiments, the plunger assembly 112 can be implemented within a conventional pumping system. Plunger 114 can be coupled with a drive rod that reciprocates to drive the plunger assembly 112 up and down the well. The pumped fluid in a pump having a conventional drive rod flows between the pump barrel and an outer tubing string. In other embodiments, the pump assembly 112 is coupled with a hollow drive rod that serves a fluid conduit. The fluid conduit defines a path for the produced fluid to be pumped to the surface. The fluid conduit can include a hollow cylinder, with the hollow portion acting as the fluid path and can be aligned with the central aperture 120 of the plunger 114. In some embodiments, a connector 140 is included to couple a fluid inverter 150 to plunger 114. Fluid inverter 150 can be included to divert the pumped fluid into the fluid conduit. The fluid conduit can be coupled to the surface pump and can reciprocate to drive the plunger assembly 112 while serving as a conduit for the pumped fluid. By using a fluid conduit as described herein, the produced fluids and any precipitate solids are contained within an inner tubing string of the pump. Thus, no fluids or solids can get between the pump and the outer tubing, so if the pump must be pulled, there will be no fluid spills. In other words, it eliminates the need to pull a wet well. This can save tremendous amounts of time and money, while providing a much safer pumping operation for both the crew as well as the environment.

In embodiments where the plunger assembly 112 includes a fluid conduit drive rod, there is no wear between the rod and the tubing as in conventional systems due to the use of a central fluid path. Additionally, the plunger assembly 112 may include a lubricating fluid between an outer tubing string (not shown) and a pump barrel 102 to further reduce wear of the pump system. Additionally, collars of the fluid conduit may be coated in a wear resistant and/or lubricating coating to prevent the collars from wearing on the inside of the outer tubing string.

FIGS. 9-10B show a pump system having a plurality of check valves 156 along a length of a conduit 110. Each check valve 156 can have a cylindrical body and include a central aperture to enable fluid to pass through the body. A sealing element can be movably seated in the aperture to seal the check valve 156. For example, the aperture can have a circular shape and the sealing element may be a spherical stainless steel ball having a diameter larger than that of the aperture. Any other shape of aperture and sealing element may be used such that the sealing element can completely seal the aperture. Sealing elements may be constructed of any material of sufficient density to seal the aperture to hold back the hydrostatic pressure above the plunger assembly 112. This allows the traveling valve to open much easier without having thousands of pounds of pressure keeping it closed. The sealed check valves 156 also prevent high volumes of solids from settling down on the plunger assembly should there be a power failure. The check valves 156 also help to preventing gas locking. Any gas in the hollow rod is compressed faster, opening the check valves 156, allowing the gas and fluid through.

Fluid conduit rods 110, such as those described in FIG. 1, can include a series of check valves 156 positioned at intervals between the plunger assembly and the surface. In some embodiments, the check valves 156 may be positioned at equal intervals along the entire length of the pump system. By including a series of check valves 156, any solids in the produced fluid that is not propelled to the surface can be prevented from settling out of the fluid and forming a large pile on the pump system. Any solids can settle evenly on each check valve 156, preventing a large plug of solids from forming on a single location, such as the plunger assembly, during a power failure or shut down. Smaller, evenly spaced plugs, along with fairly even amounts of fluid and gas, are formed at each check valve 156 along the tubing string or fluid conduit 110. This even distribution of pumped substances ensures that starting up the pump system is easier when power is restored. A domino effect is created, where the pump only lifts a single check valve 156 and small plug of solids until the gas compresses in that zone. Then as the fluid in that zone hits the next check valve 156 above, the fluid will open that check valve 156 and start lifting the solids and fluid in the next zone. Thus, the domino effect lifts one zone after another until the whole tubing string or hollow rod 110 is back in motion moving upward to the surface. Along with the check valves 156, a pair of traveling valves (not shown) may be included. Together, the two valve sets help prevent solids from sticking the plunger assembly in the pump barrel as well as preventing gas lock as described above. As shown in FIGS. 9 and 9A, upon each downstroke of the pumping system, the check valves 156 open, allowing the fluid to flow up to the surface. Upon each upstroke, or upon shutdown of the pump, the check valves 156 close, as shown in FIGS. 10 and 10A.

Figure 11:
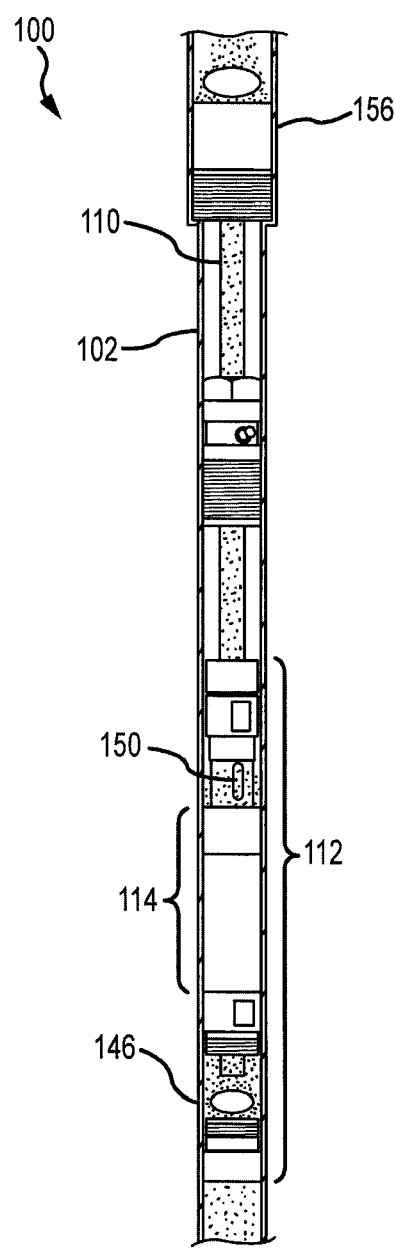
FIG. 11 shows the pumping system of FIG. 1 during a downstroke according to embodiments of the invention.
Figure 12:
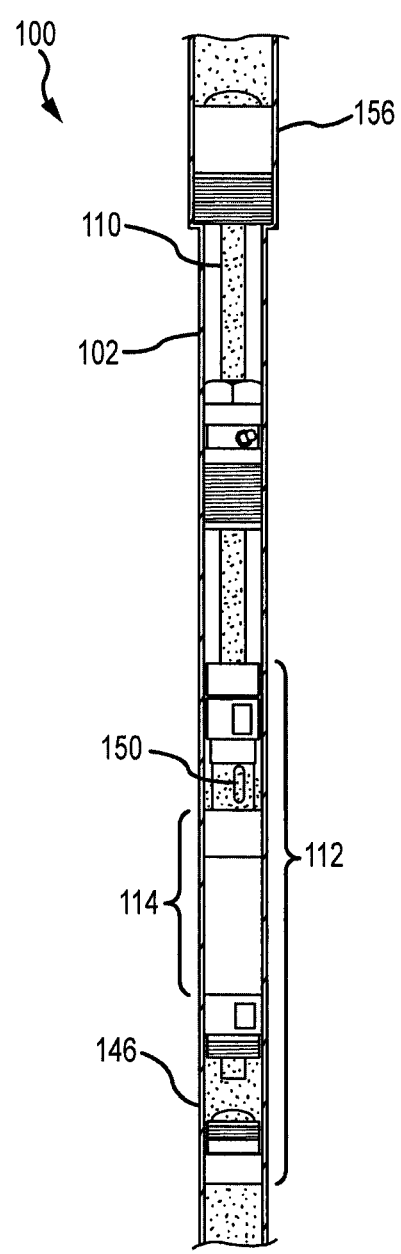
FIG. 12 shows the pumping system of FIG. 1 during an upstroke according to embodiments of the invention.

FIGS. 11-12 show the operation of the pumping system 100 described in FIGS. 1-10A. At a top of pumping system 100 is a check valve 156. Below check valve 156 is a hollow rod 110 which carries fluid and acts as the power string. Below hollow rod 110 are the fluid inverter 150 and plunger assembly 112. Plunger assembly 112 can include one or more plungers 114 and traveling valves 146. As the pumping system is started, fluid saturated with solids is lifted and forced into the fluid inverter 150 upon each downstroke shown in FIG. 11. In operation, rod 110 is translated downward to slide plunger assembly 112 further into pump barrel 102 on each downstroke. In so doing, a standing valve (not shown) is forced closed and traveling valve 146 is forced open due to the presence of a fluid within pump barrel 102. The fluid entering plunger assembly 112 passes upward where it may be evacuated from the pump. Upon each upstroke, the rod 110 is then lifted upward to close traveling valve 146 and to open the standing valve as shown in FIG. 12. This action causes a vacuum within pump barrel 102, causing standing valve 108 to lift and production fluids to enter into pump barrel 102 and/or rod 110. On the next downstroke, the process is repeated to pump additional fluids out of the well. The traveling valves 144 and standing valve 108 function in a similar manner to pump fluids in embodiments where the pump barrel 102 is reciprocated while the plunger assembly 112 remains stationary. The fluid inverter 150 transfers the solids and fluid from the larger annulus of a pump barrel 102 into the smaller hollow rod 110. Because the inside diameter of the hollow rod is much smaller than the inside diameter of the pump barrel 102, the fluid increases in velocity, allowing a surface pumping unit to pump at a slower rate of speed and maintain the velocity needed to carry the solids and fluid to the surface easily.

In a regular well, hydrostatic pressure from the fluid column builds up above check valve 156. Check valve 156 at the top serves to hold back the hydrostatic pressure above the plunger assembly 112. This allows the traveling valve 146 to open much easier without having thousands of pounds of pressure from the fluid column keeping traveling valve 146 closed. It will also prevent high volumes of solids from settling down on the plunger assembly 112 should there be a power failure. The check valve 156 also prevents gas locking. Gas locking is the condition when dissolved gas released from solution during the upstroke of the plunger assembly 112 appears as free gas between the valves. On the down stroke, pressure inside the pump barrel 102 completely filled up with gas may never reach the pressure needed to open the traveling valve 144. On the upstroke, the pressure inside the pump barrel 102 never decreases enough for a standing valve (not shown) to open and allow liquid to enter the plunger assembly 112. Thus, no fluid enters or leaves the plunger assembly 112 and the pumping system 100 is locked. In pumping system 100, the traveling valve 144 opens with each stroke the moment it touches the fluid. Even lifting as little as half a cup of fluid, the pumping system 100 stays operational. On the upstroke the gas from the larger annulus of the pump barrel 102 is forced into the smaller hollow rod 110. The gas in the hollow rod is compressed much faster, opening the check valve 156, allowing the gas and fluid through. The close proximity of the fluid inverter 150 to the plunger assembly 112 ensures that the production of fluid is achieved quickly, even when gas is present in the upper portion of the pumping system 100, further eliminating and/or preventing a gas locked state. In a conventional pump, gas locking would occur with the presence of this released gas between the valves.

What is claimed is:

1. A pumping system comprising:
 a pump barrel adapted to be placed into a well casing, the pump barrel comprising a standing valve; and
 a conduit having a top end and a bottom end, wherein the top end is coupleable with a surface pumping unit, the conduit being coupled to a plunger assembly at the bottom end and being translatable to reciprocate the plunger assembly within the pump barrel using an upstroke and a downstroke, the plunger assembly comprising:
 a fluid inverter coupled with a bottom end of the conduit and configured to divert fluids into the conduit, the fluid inverter defining an upper central lumen extending through a portion of a length of the fluid inverter, the upper central lumen being in fluid communication with a plurality of fluid ports that each extend at a downward angle from the upper central lumen through an outer surface of the fluid inverter, the plurality of fluid ports being configured to direct fluids from between the pump barrel and an outer surface of the fluid inverter into the upper central lumen and the conduit;

a plunger reciprocatably positioned within the pump barrel, the plunger having an inner diameter, an outer diameter, a bottom end, and an open top end with a tapered edge that is tapered from the inner diameter toward the outer diameter to form a tip aligned with the outer diameter;

a connector configured to couple the fluid inverter with the plunger such that a portion of the fluid inverter is received within the plunger, the connector being received within the bottom end of the fluid inverter and within the plunger at a position below the top end, wherein the top end of the plunger is adapted to direct particulate into the plunger and away from the pump barrel upon each upstroke; and a traveling valve positioned at a bottom end of the plunger, wherein upon each upstroke, the traveling valve is closed and the standing valve is opened to cause a vacuum within the pump barrel to draw fluid into the plunger assembly below the traveling valve, and wherein upon each downstroke, the traveling valve is opened and the standing valve is closed to force the fluid through the traveling valve and through the conduit to the surface.

2. The pumping system according to claim 1, wherein the conduit further comprises a plurality of check valves disposed along a length of the conduit.

3. The pumping system according to claim 1, wherein the plunger comprises a first plunger and the tapered edge comprises a first tapered edge, further including a second plunger reciprocatably positioned within the pump barrel and spaced apart and coupled with the first plunger, wherein the second plunger comprises an open bottom end with a second tapered edge that is tapered towards an inner wall of the pump barrel, and wherein the bottom end of the second plunger is adapted to direct particulate into the plunger and away from the pump barrel upon each downstroke.

4. The pumping system according to claim 3, wherein the first tapered edge and the second tapered edge each form a pointed tip, each pointed tip having a diameter within about 0.002 inches of an inner diameter of the pump barrel.

5. The pumping system according to claim 3, further comprising at least two traveling valves disposed between the first plunger and the second plunger.

6. The pumping system according to claim 3, wherein at least one of an outer diameter of each of the first plunger and the second plunger or an inner diameter of each of the first plunger and the second plunger comprises a lubricating wear resistant coating.

7. The pumping system according to claim 3, wherein the first tapered edge and the second tapered edge each comprise a first portion tapered toward the inner wall of the pump barrel and a second portion tapered toward the inner wall of the pump barrel, wherein the first portion has a different degree of taper than the second portion.

8. The pumping system according to claim 7, wherein the first portion comprises a taper of between about 5 to 30 degrees and the second portion comprises a taper of about 45-75 degrees.

9. A method for pumping fluids from the ground, the method comprising:
placing a pumping system into the ground, wherein the pumping system comprises:

a pump barrel adapted to be placed into a well casing, the pump barrel comprising a standing valve; and
a plunger assembly, the plunger assembly comprising:
a conduit for transporting pumped fluid, the conduit disposed within the pump barrel and having a top end and a bottom end, wherein the top end is coupleable with a surface pumping unit;
a fluid inverter coupled with a bottom end of the conduit and configured to divert fluids into the conduit, the fluid inverter defining an upper central lumen extending through a portion of a length of the fluid inverter, the upper central lumen being in fluid communication with a plurality of fluid ports that each extend at a downward angle from the upper central lumen through an outer surface of the fluid inverter, the plurality of fluid ports being configured to direct fluids from between the pump barrel and an outer surface of the fluid inverter into the upper central lumen and the conduit;
a plunger comprising an open top end with a tapered edge, the plunger being reciprocatably positioned within the pump barrel, the plunger having an inner diameter, an outer diameter, a bottom end, and an open top end with a tapered edge that is tapered from the inner diameter toward the outer diameter to form a tip aligned with the outer diameter;
a traveling valve disposed at a bottom end of the plunger; and
a connector configured to couple the fluid inverter with the plunger such that a portion of the fluid inverter is received within the plunger, the connector being received within the plunger below the open top end and coupled within the bottom end of the fluid inverter;
reciprocating the conduit and plunger within the pump barrel with at least one upstroke and at least one downstroke;
closing the traveling valve and opening the standing valve upon each upstroke to create a vacuum within the pump barrel and plunger assembly to draw fluid into the plunger assembly below the traveling valve;
opening the traveling valve and closing the standing valve upon each downstroke to force the fluid through the traveling valve and through the conduit to the surface; and
directing particulate into the plunger through the open top end and away from the pump barrel upon each upstroke with the tapered edge.

10. The method according to claim 9, wherein the plunger comprises a first plunger, the method further comprising reciprocating a second plunger comprising an open bottom end with a tapered edge, the second plunger being coupled with the first plunger, and wherein the method further comprises directing particulate into the second plunger through the open bottom end and away from the pump barrel upon each downstroke with the tapered edge.

11. The method according to claim 9, wherein the tapered edge comprises a first portion tapered towards an inner wall of the pump barrel and a second portion tapered towards the inner wall of the pump barrel, wherein the first portion has a different degree of taper than the second portion.

12. A plunger assembly, the plunger assembly comprising:
a fluid inverter coupleable with a bottom end of a hollow reciprocatable rod, and configured to divert fluids into the reciprocatable rod, the fluid inverter defining an upper central lumen extending through a portion of a length of the fluid inverter, the upper central lumen being in fluid communication with a plurality of fluid ports that each extend at a downward angle from the upper central lumen through an outer surface of the fluid inverter, the plurality of fluid ports being configured to direct fluids from between a pump barrel and an outer surface of the fluid inverter into the upper central lumen and the reciprocatable rod;

a connector configured to couple the fluid inverter with a first plunger such that a portion of the fluid inverter is received within the first plunger, the connector being received within a bottom end of the fluid inverter;

the first plunger comprising an inner diameter, an outer diameter, a bottom end, and an open top end with a first tapered edge that is tapered from the inner diameter toward the outer diameter to form a tip aligned with the outer diameter, wherein:

the first tapered edge comprises two or more different degrees of taper along a length of the first tapered edge, the first plunger receives the connector at a position below the top end, wherein the first plunger is configured to reciprocate within the pump barrel, and the top end of the first plunger is adapted to direct particulate into the first plunger and away from the pump barrel upon an upstroke of the plunger assembly;

a traveling valve comprising a top end and a bottom end, the top end of the traveling valve being positioned at a bottom end of the first plunger; and a second plunger comprising an inner diameter, an outer diameter, a top end, and an open bottom end with a second tapered edge that is tapered from the inner diameter toward the outer diameter to form a tip aligned with the outer diameter, wherein:

the second plunger being coupled with the bottom end of the traveling valve, the second plunger is configured to reciprocate within a pump barrel, and the bottom end of the second plunger is adapted to direct particulate into the second plunger and away from the pump barrel upon each downstroke of the plunger assembly, wherein upon each upstroke, the traveling valve is closed and the standing valve is opened to cause a vacuum within the pump barrel to draw fluid into the plunger assembly below the traveling valve, and wherein upon each downstroke, the traveling valve is opened and the standing valve is closed to force the fluid through the traveling valve and up to the surface.

13. The plunger assembly according to claim 12, wherein one or both of the first tapered edge and the second tapered edge comprises two or more different degrees of taper along a length of the tapered edge.

\* \* \* \* \*